(12) United States Patent
Matsumoto

(10) Patent No.: US 10,511,603 B2
(45) Date of Patent: Dec. 17, 2019

(54) CONTENT SUGGESTION MECHANISM

(71) Applicant: David K. Matsumoto, San Jose, CA (US)

(72) Inventor: David K. Matsumoto, San Jose, CA (US)

(73) Assignee: David K. Matsumoto, San Jose, CA (US)

(*) Notice: Subject to any disclaimer, the term of this patent is extended or adjusted under 35 U.S.C. 154(b) by 94 days.

(21) Appl. No.: 15/605,539

(22) Filed: May 25, 2017

(65) Prior Publication Data

US 2018/0159858 A1 Jun. 7, 2018

Related U.S. Application Data

(60) Provisional application No. 62/430,575, filed on Dec. 6, 2016.

(51) Int. Cl.
*H04L 29/06* (2006.01)

(52) U.S. Cl.
CPC ............ *H04L 63/10* (2013.01); *H04L 63/101* (2013.01); *H04L 63/102* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,079,044 B1* | 12/2011 | Craner | ............... | H04N 21/4532 725/28 |
| 9,077,715 B1* | 7/2015 | Satish | ..................... | H04L 63/10 |
| 9,491,176 B1* | 11/2016 | Jaini | ....................... | H04L 63/10 |
| 2003/0046097 A1* | 3/2003 | LaSalle | ............... | G06Q 10/063 705/7.33 |
| 2004/0003071 A1* | 1/2004 | Mathew | .................. | G06F 21/62 709/223 |
| 2005/0097595 A1* | 5/2005 | Lipsanen | ................ | G06F 21/10 725/25 |
| 2005/0144297 A1* | 6/2005 | Dahlstrom | ............ | H04L 63/101 709/229 |
| 2010/0011392 A1* | 1/2010 | Bronstein | .......... | G06K 9/00758 725/28 |
| 2013/0091582 A1* | 4/2013 | Chen | ....................... | G06Q 10/10 726/26 |
| 2013/0219517 A1* | 8/2013 | Yerli | ....................... | H04L 63/10 726/28 |
| 2014/0129630 A1* | 5/2014 | Nikain | .................. | G06F 16/954 709/204 |
| 2015/0070516 A1* | 3/2015 | Shoemake | ....... | H04N 21/42203 348/207.11 |
| 2015/0082335 A1* | 3/2015 | Cobb | ................. | H04N 21/4542 725/28 |
| 2015/0095985 A1* | 4/2015 | Hua | ........................ | H04L 63/10 726/4 |

(Continued)

*Primary Examiner* — Ponnoreay Pich
(74) *Attorney, Agent, or Firm* — Jaffery Watson Mendonsa & Hamilton LLP

(57) ABSTRACT

A method to facilitate control of media content access is disclosed. The method includes acquiring relationship information from one or more external sources, generating trust relationship information based on the relationship information and authorizing access to media content upon a determination that the content has been provided an approval rating by one or more individuals included in the trust relationship information.

19 Claims, 7 Drawing Sheets

(56) References Cited

U.S. PATENT DOCUMENTS

| | | | | |
|---|---|---|---|---|
| 2015/0244725 A1* | 8/2015 | Ziskind | ................ | H04L 63/101 |
| | | | | 726/28 |
| 2015/0365379 A1* | 12/2015 | Wu | .................... | H04L 63/0245 |
| | | | | 726/14 |
| 2018/0129514 A1* | 5/2018 | Lefevre | ................ | G06F 9/4451 |

* cited by examiner

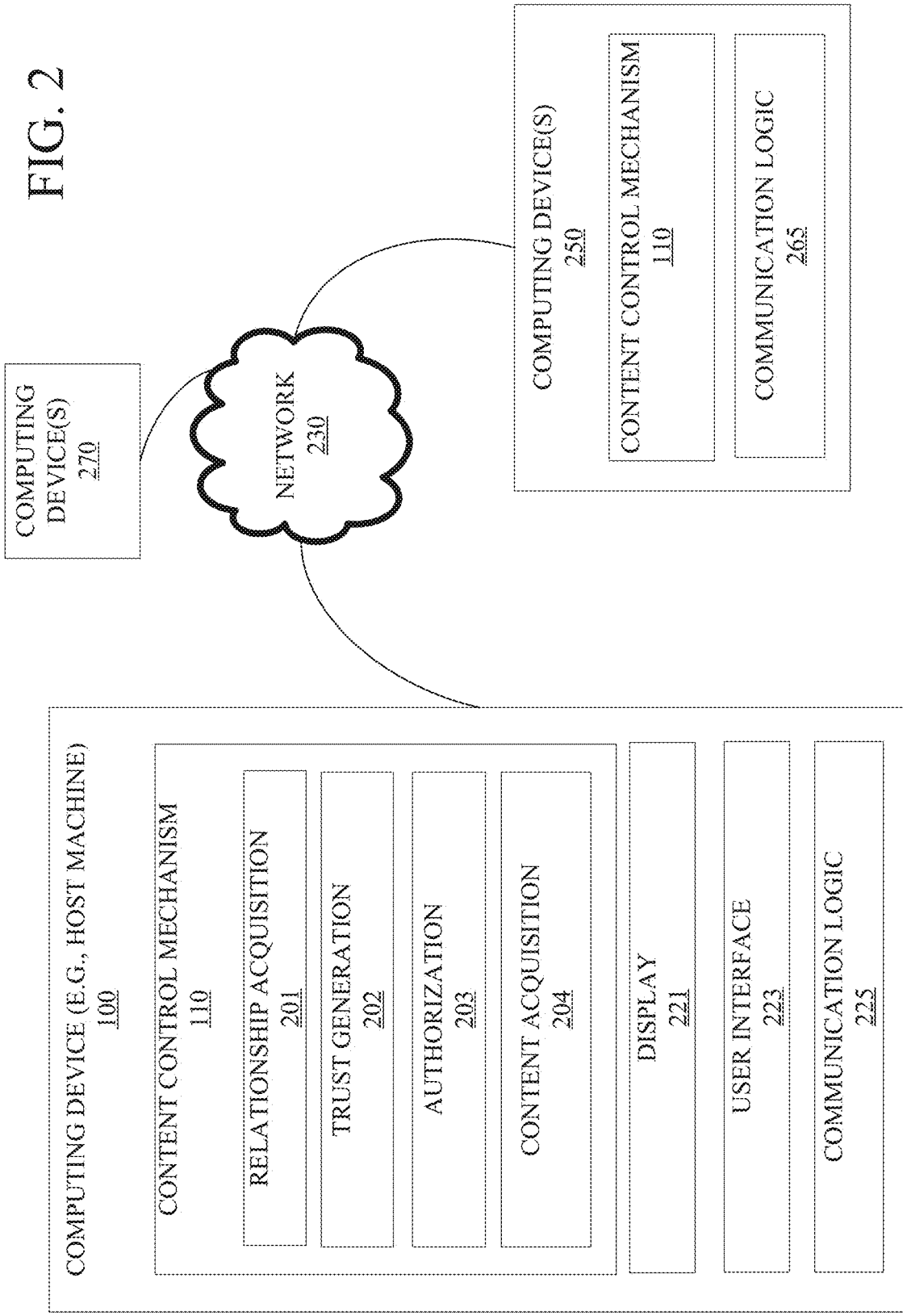

US 10,511,603 B2

CONTENT SUGGESTION MECHANISM

This application claims priority from Provisional U.S. Patent Application No. 62/430,575, filed Dec. 6, 2016, entitled Graph-Based Parental Controls for Unsupervised Access to Digital Content, which is incorporated herein by reference in its entirety and for all purposes.

FIELD OF INVENTION

This invention relates generally to controlling access to digital content.

BACKGROUND OF THE DESCRIPTION

Managing and authorizing access to content on the Internet is a time-consuming and error-prone task for parents and organizations alike. For instance, the curation of child-appropriate collections does not scale well because digital content (e.g., audio, applications, games, videos, etc.) needs to be vetted and categorized as appropriate for various age groups. Specifically, a parent allowing a child to view or play digital content when unattended must rely on curated collections of content deemed safe and/or appropriate by external organizations, manually manage a list of content, or directly supervise the child while consuming (e.g., viewing or listening) content on a digital media device, such as a computer, tablet, or video game console. Curated collections require significant effort to maintain, and cannot keep up with the incredible pace of uploaded content. In addition, sometimes inappropriate content may often be inadvertently included. Thus, management of an approved list of digital content by a parent alone is a time-consuming task, as is parental supervision whenever a child would like to consume digital content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may adroit to other equally effective embodiments.

FIG. 2 illustrates one embodiment of a content control mechanism;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments may be embodied in systems, apparatuses, and methods for content control, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

Embodiments provide for creating, importing, and maintaining relationships between users, and allowing users to control access to content by other users with or without explicitly specifying permission. In further embodiments, users are enabled to permit access to content directly from the content creators through specific relationships. In yet another embodiment, users are allowed to request access to content, and the result of the request will be returned to the user.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed from the below discussed computing device to facilitate various embodiments including adding, removing, and/or enhancing certain features. For brevity, clarity, and ease of understanding of the computing device, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
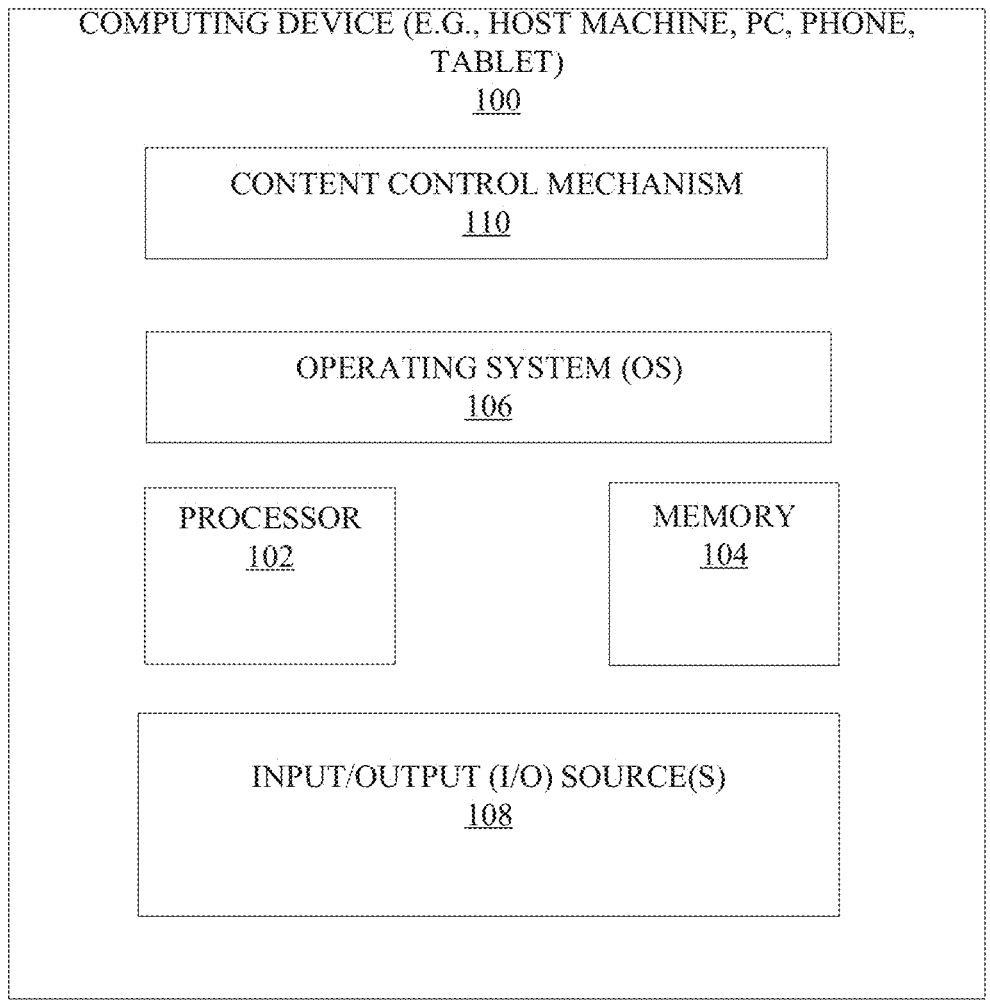
FIG. 1 illustrates one embodiment of a computing device employing a content control mechanism.

FIG. 1 illustrates a content control mechanism 110 at a computing device 100 according to one embodiment. In one embodiment, computing device 100 serves as a host machine for hosting content control mechanism 110 that includes a combination of any number and type of components for facilitating content control at computing devices, such as computing device 100. In such an embodiment, computing device 100 includes a wireless computing device, such as a mobile computing device (e.g., smartphones, tablet computers, etc.). However, computing device may be implemented as server computing devices, cameras, PDAs, personal computing devices (e.g., desktop devices, laptop computers, etc.), smart televisions, servers, wearable devices, media players, any smart computing devices, and so forth. Embodiments, however, are not limited to these examples.

Computing device 100 may include an operating system (OS) 106 serving as an interface between hardware and/or physical resources of the computer device 100 and a user. Computing device 100 may further include one or more processors 102, memory devices 104, network devices, drivers, or the like, as well as input/output (I/O) sources 108, such as touchscreens, touch panels, touch pads, virtual or regular keyboards, virtual or regular mice, etc.

According to one embodiment, content control mechanism 110 enables a user of computing device 100 to create, import, or maintain a list of relationships with users at other computing devices in order to establish content controls of content to be consumed at computing device 100, or any other computing device assigned to or controlled by the user. In a further embodiment, content control mechanism 110 enables a user to explicitly approve of specific digital content for access by users within the user's control (e.g., minor children). Accordingly, users may inherit the approval ratings of content created by others outside of the user's control and apply those approval ratings to individuals within the user's control. For example, a computing device 100 implementing content control mechanism 110 being used by a child inherits the approval ratings for a particular content creator via an explicit trust relationship between the child's parent and a trusted friend of the parent. Content may include any type of media content (e.g., information and experiences that are directed towards an end-user or audience), such as images, audio and or/video content.

FIG. 2 illustrates a content control mechanism 110 employed at computing device 100. In one embodiment, content control mechanism 110 may include any number and type of components, such as: relationship acquisition module 201, trust generation logic 202, authorization logic 203 and content acquisition module 204. Relationship acquisition module 201 acquires the relationship information for a user from external sources. In such an embodiment, the relationship information may be stored in a flat file, a relational database, a graph-based database, or any other method that allows the storage and retrieval of data. In a further embodiment, the relationship information may be stored at an external server, such as computing device 270.

In one embodiment, relationship acquisition module 201 acquires the relationship information via communication logic 225. Communication logic 225 may be used to facilitate dynamic communication and compatibility between various computing devices, such as computing device 100 and one or more computing devices 250 (e.g., via a cloud network, the Internet, intranet, cellular network, proximity or near proximity networks, etc.).

It is contemplated that any number and type of components 201-204 of content control mechanism 110 may not necessarily be at a single computing device and may be allocated among or distributed between any number and type of computing devices. Thus, a computing device 250 may also include content control mechanism 110 to perform functionality for one or more of components 201-204. Computing device 250 may also include communication logic 265 to communicate with communication logic 225. Communication logic 265 may be similar to or the same as communication logic 225 of computing device 100 and may be used to facilitate communication with content control mechanism 110 at computing device 100 over network 230.

In a further embodiment, computing device 250 may be the device of a child of the user of computing device 100. In such an embodiment, the child's computing device 250 includes a version of content control mechanism 110 that is linked to content control mechanism 110 of computing device 100. In a further embodiment, the minor user must log in to content control mechanism 110 to have the ability to access media content at the device 250. As a result, content cannot be acquired at computing device 250 without being authorized content control mechanism 110.

Figure 3B:
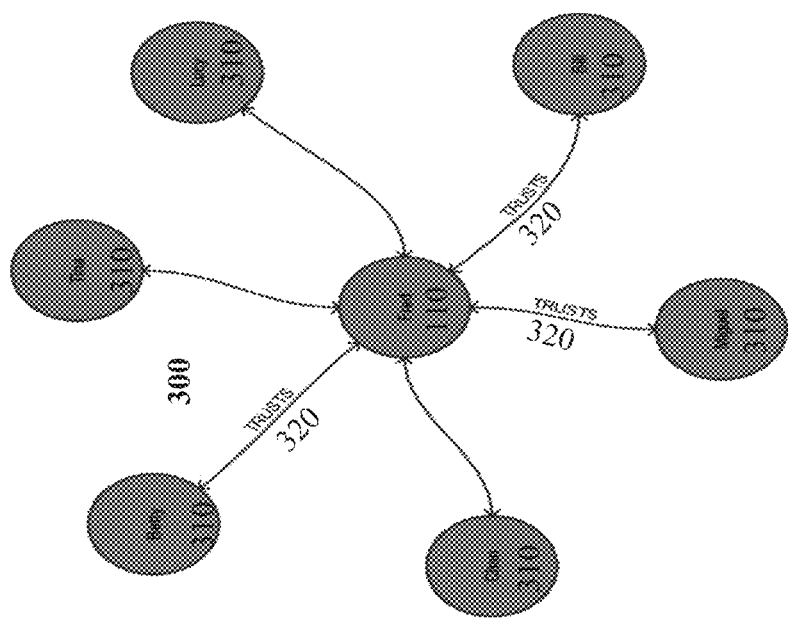
FIG. 3B illustrates one embodiment of a trust relationship graph.
Figure 3A:
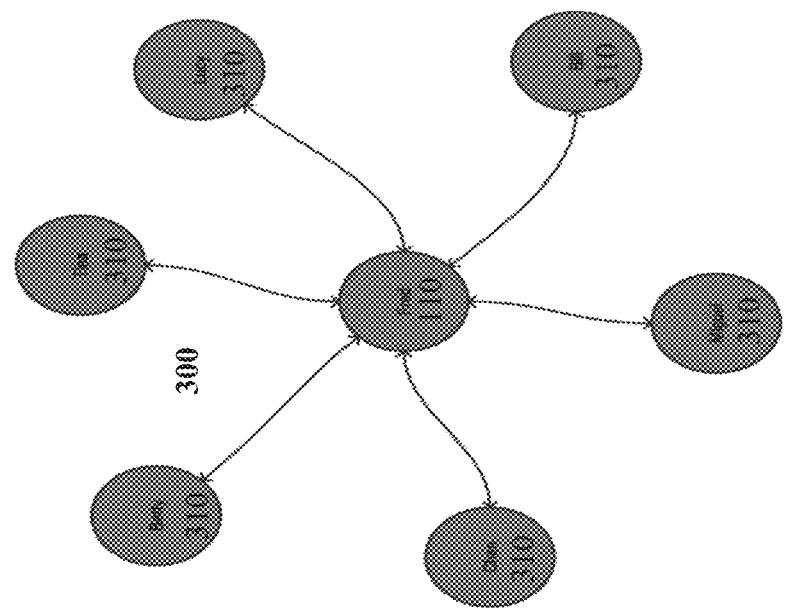
FIG. 3A illustrates one embodiment of a social graph.

According to one embodiment, relationship acquisition module 201 may acquire relationship information from social media sites, such as Facebook®, Google+®, and LinkedIn®, etc. Such media sites include graphs that connect users to their friends, as well as friends of friends, and so on. FIG. 3A illustrates one embodiment of relationship information including such a social graph 300 having one degree of separation. As shown in FIG. 3A, Fred is a user at computing device 110 that has relationships with other users 310.

Within a user's social graph, however, there could be more virtual friends than real friends present. Therefore, a content control system based purely on a social graph is not sufficient. Thus, trust generation logic 202 generates a trust layer to the relationship information. In such an embodiment, the trust layer enables a user to edit a relationship to indicate a trust relationship with a friend included in the relationship information.

For instance, the trust relationship may indicate individuals (or friends) in which the user may trust to care for the user's children, or those in which the user shares morals and values. Thus, the trust relationship information indicates individuals in the social graph (or relationship information) in which the user trusts to approve of media content on behalf of the user. In further embodiments, other criteria may be implemented to facilitate the trust layer. For example, the relationships may include properties such as age ranges that is used to screen content for users below the age range.

According to one embodiment, trust generation logic 202 generates the trust layer by displaying the relationship information to the user via a display device 221 and prompting the user to indicate, via user interface 223, individuals within the relationship information that the user trusts. FIG. 3B illustrates one embodiment of relationship information including trust relationships. As disclosed in FIG. 3B, trust generation logic 202 is implemented to enable Fred to generate a trust relationship with Betty, Bill and Miguel.

Referring back to FIG. 2, authorization logic 203 authorizes the consumption of content by minors designated by the user based on the trust layer. Thus, authorization logic 203 authorizes content to be consumed by minor users only if the content has been approved by an individual who has been designated in the trust relationship information as a trusted friend. Content that is approved by a trusted individual is given an approval rating indicating that the content is authorized for consumption at content control mechanism 110. In a further embodiment, authorization logic 203 may also be implemented to directly apply approval ratings for individual content, or for all content provided by a specific content provider.

In some embodiments, a default setting may be for authorization logic to implement the trust relationship information to authorize content for all users, unless a user is specifically designated. Accordingly, content access may only be authorized for minor or unknown users based on the trust relationship information, while being automatically authorized for designated adult users.

Upon authorization, content acquisition module 204 acquires the content for consumption. As discussed above, the device of a child user includes a version of content control mechanism 110 linked to that of computing device 100. Accordingly, authorization logic 203 monitors minor users whenever a minor user accesses a linked device. In such an embodiment, authorization logic 203 provides access of only approved content to the minor user. In a further embodiment, authorization logic 203 maintains a record of all content attempted to be accessed by the child user, as well as content that was approved for acquisition.

Figure 4:
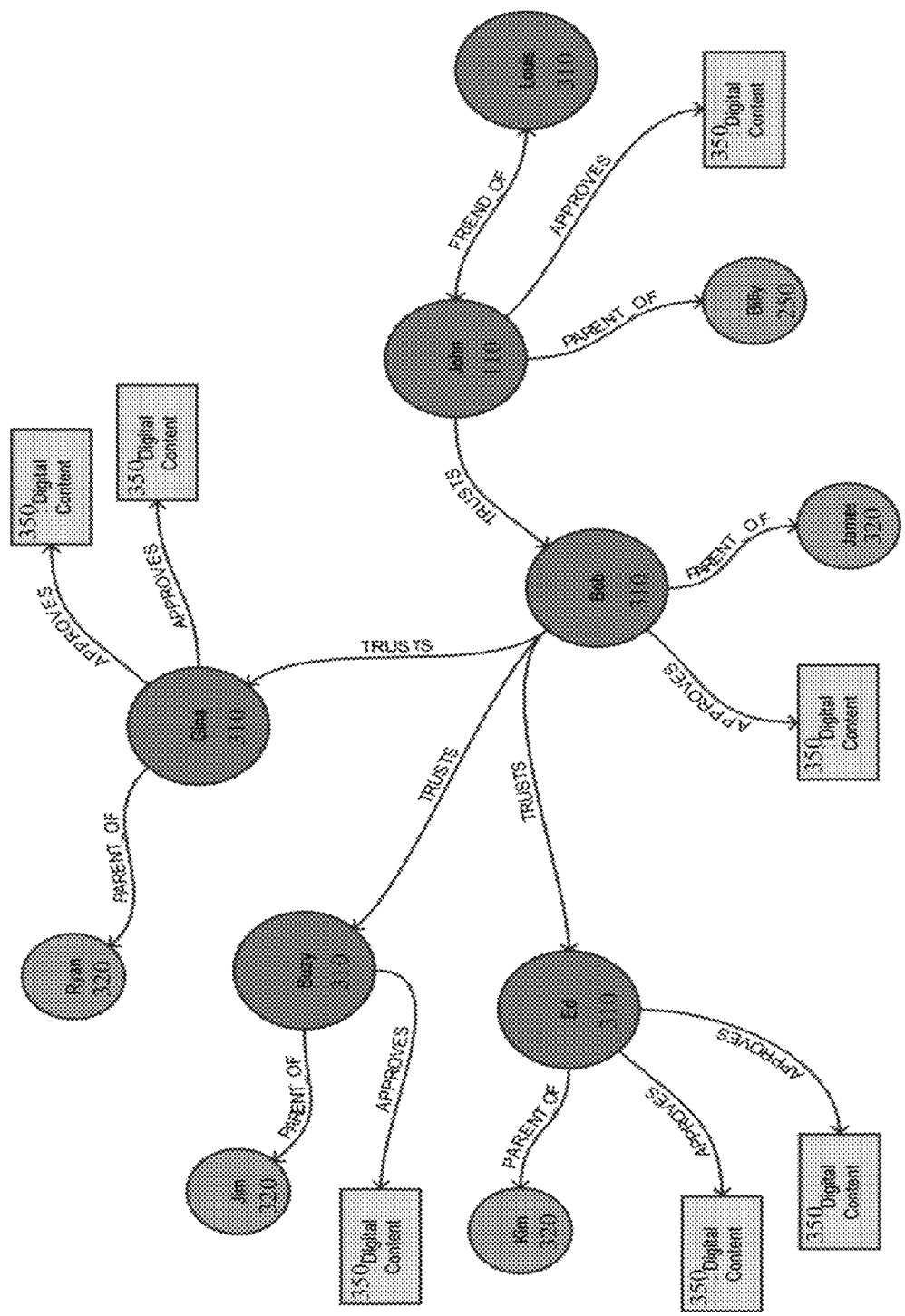
FIG. 4 illustrates another embodiment of a trust relationship graph.

FIG. 4 illustrates another embodiment of a trust relationship graph 400 having multiple degrees of separation. In this embodiment, John is the user at computing device 110 having direct relationships with users Bob and Louis, and a child Billy at a computing device 250. Additionally, Bob has relationships with Ed, Suzy and Gina, and a child James. As shown in FIG. 4, John trusts Bob, but does not trust Louis. Thus, there is a trust relationship between John and Bob.

In addition, John and Bob can each approve of content (e.g., videos) for their respective sons, Billy and James. Since John trusts Bob, his son Billy will now be able to watch any video that James can watch. In one embodiment, the trust relationship is not necessarily bidirectional. As shown in FIG. 4, John can trust Bob, but Bob does not necessarily have to trust John. Therefore, James will not necessarily be able to watch whatever Billy watches. In a further embodiment, content may be marked with tags so that content within the trusted social graph is searchable for things like subject and age appropriateness, but not limited to those properties.

According to one embodiment, implementation of content control mechanism 110 enables the control of an endless quantity of content by opening up a user's trusted circle to friends of friends (two degrees of separation), friends of friends of friends (three degrees of separation) and further. In the one degree of separation case, James could only watch the one video that Bob had approved. However, now that Bob has extended his circle of trust, James can access the two videos approved by Ed, the one approved by Suzy, and the two approved by Gina. Should Bob later realize that Gina has questionable judgement, he can explicitly "distrust" Gina so that her suggested videos no longer appear in James' playlist.

Figure 5:
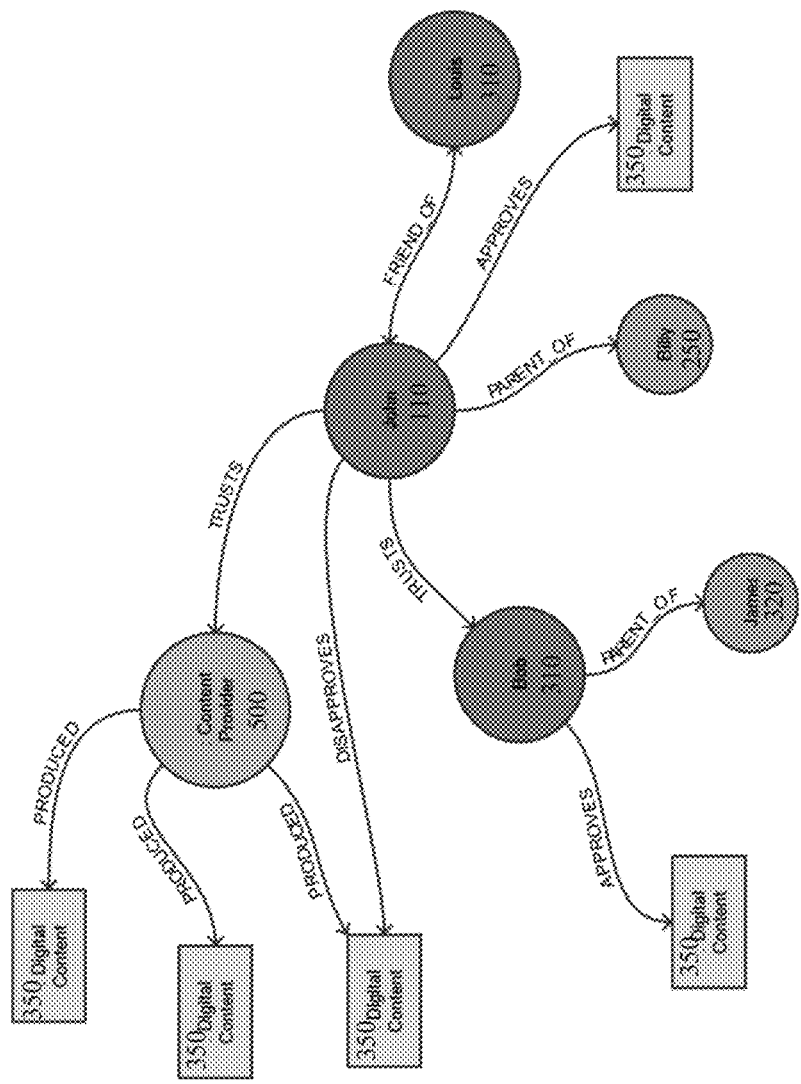
FIG. 5 illustrates yet another embodiment of a trust relationship graph.

In addition, a parent user can trust other entities, such as content providers. FIG. 5 illustrates an embodiment of a trust relationship graph including a content provider 500. As shown in FIG. 5, if John trusts the content provider 500, Billy will automatically be able to view all of the content provider's 500 digital content. If, for whatever reason, the content provider does have questionable content, John can explicitly "disapprove" of that content. A discussed above, the relationships can have properties such as age ranges. Thus, John could "disapprove" of the content provider's 500 video above for any kids below the age of 8. If Billy has a birthdate property, it can be used to determine whether or not he will get to watch this video.

It is inevitable for conflicts to arise in which some trusted friends will approve of a particular piece of content, while another trusted friend will not. According to one embodiment, users are enabled to make more informed decisions about approving content by reviewing statistical information about each piece of content, as seen by his "trusted" network. For example, John may want to see what others think about Louis' approved content. Moreover, some people in his network may also be connected with Louis, and may trust Louis' judgement as well. Perhaps Louis, within his own network, has a high percentage of users that trust him as well.

Figure 6:
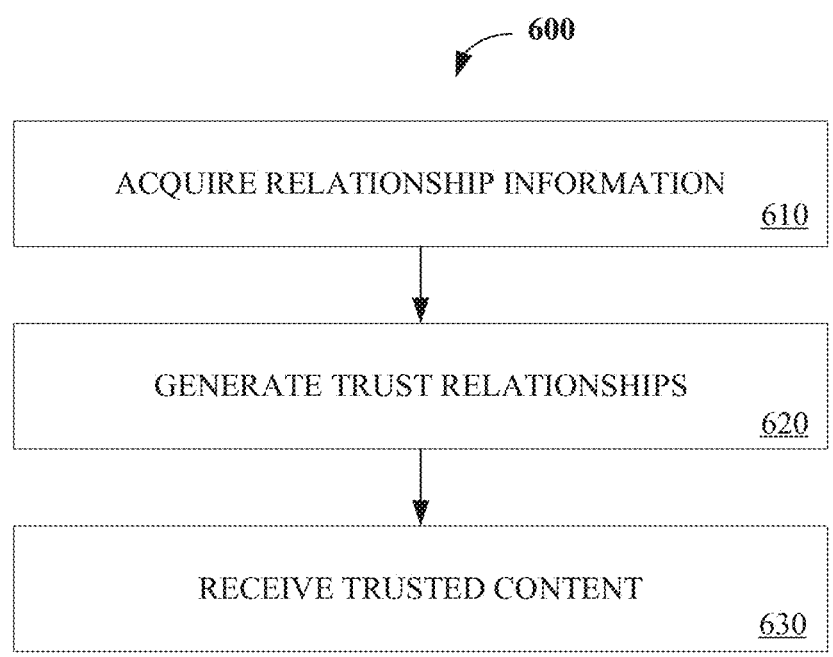
FIG. 6 is a flow diagram illustrating one embodiment of a process performed by a content control mechanism.

FIG. 6 is a flow diagram illustrating one embodiment of a process 600 performed by a content control mechanism. Process 600 may be performed by processing logic that may comprise hardware (e.g., circuitry, dedicated logic, programmable logic, etc.), software (such as instructions run on a processing device), or a combination thereof. In one embodiment, processes 600 and 650 may be performed by content control mechanism 110. The processes of 600 and 650 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

According to one embodiment, process 600 is implemented as a configuration stage for a content control mechanism. At processing block 610, relationship information is acquired. As discussed above, content control mechanism may include different modes of operation depending upon the user. In one embodiment, a parent user may access a social media account, resulting in the acquisition of the relationship information. At processing block 620, the trust relationships are generated using the relationship information and any other content sources indicated by the user. At processing block 630, one or more trusted content sources are received. Subsequently, content control mechanism is ready to be implemented to control content.

During the runtime stage content control mechanism 110 presents content that is allowed to be consumed by the user based on the trust relationship. Thus, children using a content control mechanism 110 will only be given a list of content that the system has deemed appropriate.

Figure 7:
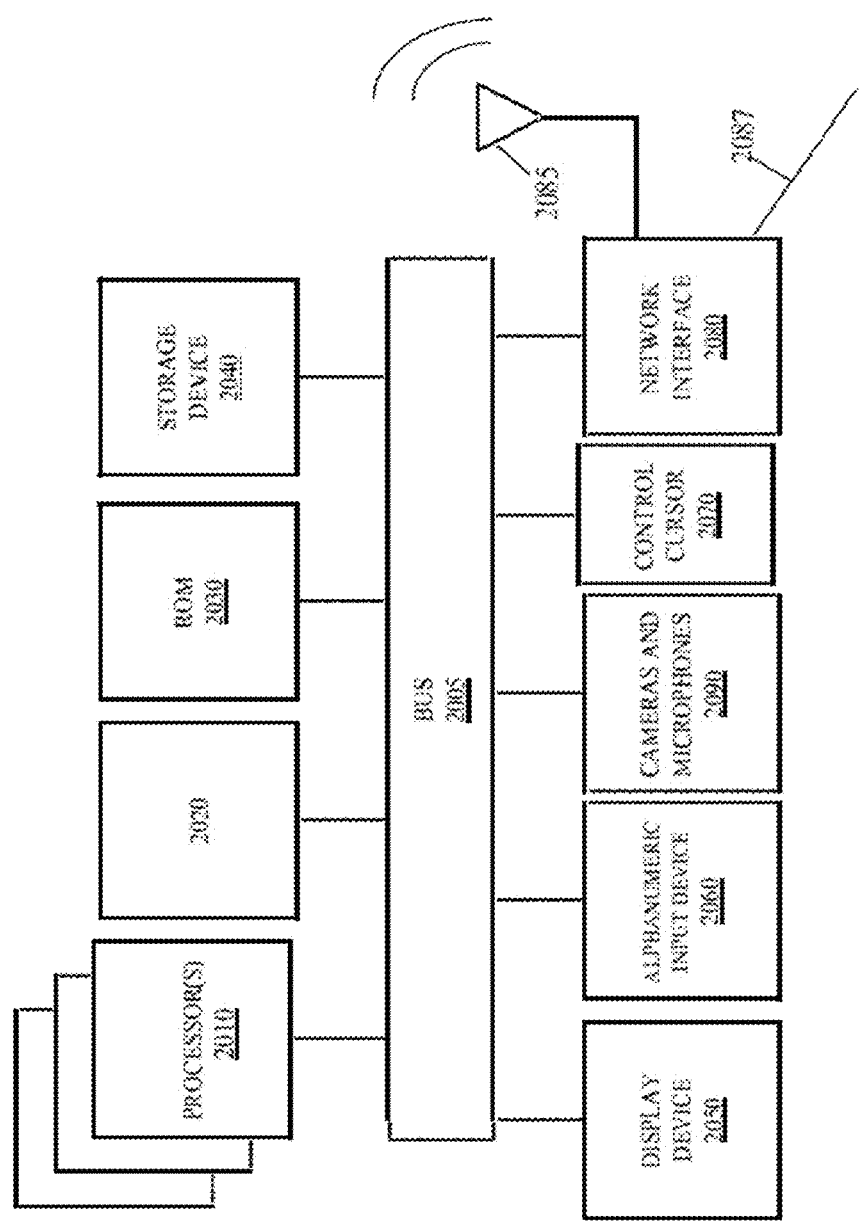
FIG. 7 illustrates one embodiment of a computer system.

FIG. 7 illustrates one embodiment of a computer system 2000, which may be representative of computing device 100 and computing device 250. Computing system 2000 includes bus 2005 (or, for example, a link, an interconnect, or another type of communication device or interface to communicate information) and processor 2010 coupled to bus 2005 that may process information. While computing system 2000 is illustrated with a single processor, electronic system 2000 may include multiple processors and/or co-processors, such as one or more of central processors, graphics processors, and physics processors, etc. Computing system 2000 may further include random access memory (RAM) or other dynamic storage device 2020 (referred to as main memory), coupled to bus 2005 and may store information and instructions that may be executed by processor 2010. Main memory 2020 may also be used to store temporary variables or other intermediate information during execution of instructions by processor 2010.

Computing system 2000 may also include read only memory (ROM) and/or other storage device 2030 coupled to bus 2005 that may store static information and instructions for processor 2010. Date storage device 2040 may be coupled to bus 2005 to store information and instructions. Date storage device 2040, such as magnetic disk or optical disc and corresponding drive may be coupled to computing system 2000.

Computing system 2000 may also be coupled via bus 2005 to display device 2050, such as a cathode ray tube (CRT), liquid crystal display (LCD) or Organic Light Emitting Diode (OLED) array, to display information to a user. User input device 2060, including alphanumeric and other keys, may be coupled to bus 2005 to communicate information and command selections to processor 2010. Another type of user input device 2060 is cursor control 2070, such as a mouse, a trackball, a touchscreen, a touchpad, or cursor direction keys to communicate direction information and command selections to processor 2010 and to control cursor movement on display 2050. Camera and microphone arrays 2090 of computer system 2000 may be coupled to bus 2005 to observe gestures, record audio and video and to receive and transmit visual and audio commands.

Computing system 2000 may further include network interface(s) 2080 to provide access to a network, such as a local area network (LAN), a wide area network (WAN), a metropolitan area network (MAN), a personal area network (PAN), Bluetooth, a cloud network, a mobile network (e.g., 3rd Generation (3G), etc.), an intranet, the Internet, etc.

Network interface(s) 2080 may include, for example, a wireless network interface having antenna 2085, which may represent one or more antenna(e). Network interface(s) 2080 may also include, for example, a wired network interface to communicate with remote devices via network cable 2087, which may be, for example, an Ethernet cable, a coaxial cable, a fiber optic cable, a serial cable, or a parallel cable.

Network interface(s) 2080 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 2080 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 2080 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 2000 may vary from implementation to implementation depending upon numerous factors, such as price constraints, performance requirements, technological improvements, or other circumstances. Examples of the electronic device or computer system 2000 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a printed circuit board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements cooperate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus to facilitate control of media content access, comprising:
a memory; and a processor configured to acquire relationship information from one or more external sources, generate trust relationship information based on the relationship information, display the trust relationship information via a user interface, receive user input indicating a trust relationship of one or more individuals included in the trust relationship information, authorize access to media content upon a determination that the content has been provided an approval rating by the one or more individuals having the trust relationship and acquiring the media content upon the media content being authorized, wherein the relationship information comprises one or more social graphs.

2. The apparatus of claim 1, wherein the trust relationship information indicates one or more individuals within the relationship information that the user trusts to approve of media content on behalf of the user.

3. The apparatus of claim 2, wherein the processor stores the relationship information once acquired.

4. The apparatus of claim 2, wherein the approval ratings are further applied to all media content provided by a content provider.

5. The apparatus of claim 4, wherein the approval ratings are further applied to media individual content.

6. The apparatus of claim 2, wherein the processor acquires the media content upon the media content being authorized by the authorization logic.

7. The apparatus of claim 1, wherein the one or more external sources comprise one or more social media sites.

8. At least one non-transitory machine-readable medium comprising a plurality of instructions that in response to being executed on a computing device, causes the computing device to carry out operations comprising:
    acquiring relationship information from one or more external sources, wherein the relationship information comprises one or more social graphs;
    generating trust relationship information based on the relationship information;
    displaying the trust relationship information via a user interface,
    receive user input indicating a trust relationship of one or more individuals included in the trust relationship information;
    authorizing access to media content upon a determination that the content has been provided an approval rating by one or more individuals having the trust relationship; and
    acquiring the media content upon the media content being authorized.

9. The at least one non-transitory machine-readable medium of claim 8, wherein the trust relationship information indicates one or more individuals within the relationship information that the user trusts to approve of media content on behalf of the user.

10. The at least one non-transitory machine-readable medium of claim 9, comprising a plurality of instructions that in response to being executed on a computing device, further causes the computing device to carry out operations comprising storing the relationship information once acquired.

11. The at least one non-transitory machine-readable medium of claim 9, wherein the approval ratings are further applied to all media content provided by a content provider.

12. The at least one non-transitory machine-readable medium of claim 11, wherein the approval ratings are further applied to media individual content.

13. The at least one non-transitory machine-readable medium of claim 9, comprising a plurality of instructions that in response to being executed on a computing device, further causes the computing device to carry out operations comprising acquiring the media content upon the media content being authorized.

14. The at least one machine-readable medium of claim 8, wherein the one or more external sources comprise one or more social media sites.

15. A method to facilitate control of media content access, comprising:
    acquiring relationship information from one or more external sources, wherein the relationship information comprises one or more social graphs;
    generating trust relationship information based on the relationship information;
    displaying the trust relationship information via a user interface,
    receive user input indicating a trust relationship of one or more individuals included in the trust relationship information;
    authorizing access to media content upon a determination that the content has been provided an approval rating by one or more individuals having the trust relationship; and
    acquiring the media content upon the media content being authorized.

16. The method of claim 15, wherein the trust relationship information indicates one or more individuals within the relationship information that the user trusts to approve of media content on behalf of the user.

17. The method of claim 16, further comprising storing the relationship information once acquired.

18. The method of claim 16, wherein the approval ratings are further applied to all media content provided by a content provider.

19. The method of claim 18, wherein the approval ratings are further applied to media individual content.

* * * * *